United States Patent
Parrish

(10) Patent No.: US 9,820,446 B2
(45) Date of Patent: *Nov. 21, 2017

(54) LINE ATTACHMENT MECHANISM AND SYSTEMS AND METHODS FOR USING THE SAME

(71) Applicant: David Parrish, Visalia, CA (US)

(72) Inventor: David Parrish, Visalia, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/397,725

(22) Filed: Jan. 3, 2017

(65) Prior Publication Data

US 2017/0118924 A1 May 4, 2017

Related U.S. Application Data

(63) Continuation-in-part of application No. 14/676,343, filed on Apr. 1, 2015, now Pat. No. 9,532,511.

(51) Int. Cl.
| A01G 17/06 | (2006.01) |
| A01G 9/12 | (2006.01) |
| A01G 1/00 | (2006.01) |
| A01G 17/10 | (2006.01) |

(52) U.S. Cl.
CPC ............ *A01G 9/126* (2013.01); *A01G 1/001* (2013.01); *A01G 17/06* (2013.01); *A01G 17/10* (2013.01); *A01G 2017/065* (2013.01)

(58) Field of Classification Search
CPC ... A01G 9/126; B60P 7/14; B60P 7/15; Y10T 403/32434; Y10T 24/2158
USPC .... 47/42, 43, 44, 45, 46, 47, 772, 777, 778, 47/779, 780, 781, 796, 803, 805, 806;
(Continued)

(56) References Cited

U.S. PATENT DOCUMENTS

| 23,338 A | 3/1859 | Aylesworth |
| 193,969 A | 8/1877 | Laprade |

(Continued)

FOREIGN PATENT DOCUMENTS

| CN | 103128699 A | 6/2013 | |
| DE | 102012109241 A1 * | 6/2014 | ................ F16B 2/08 |

(Continued)

OTHER PUBLICATIONS

Orchard Valley Supply—In-Line Wire Tightener—downloaded Dec. 2014 from http://www.orchardvalleysupply.com/ovsstore/pc/In-Line-Wire-Tightener-15p18.htm.
(Continued)

*Primary Examiner* — Monica Williams
*Assistant Examiner* — Ebony Evans
(74) *Attorney, Agent, or Firm* — Mark D. Miller; William K. Nelson; Jared E. Christensen

(57) ABSTRACT

The present invention provides improved attachment devices fort support lines in plant growth support systems (e.g., trellis systems) and methods of using the same, and offers significant improvements in efficiency with regard to assembling, adjusting, and disassembling the support systems for plant and crop growth. The attachment devices may be advantageously used for various vine and low-lying plants (e.g., grapes, tomatoes, etc.) that can be grown in a trellis system or other vertical growth support system. The anchoring devices may include a wire loop for slipping over an end support bar and a wire strainer bracket attached to the wire loop.

28 Claims, 12 Drawing Sheets

(58) Field of Classification Search
USPC .............. 254/213; 248/301, 302; 242/388.2, 242/388.3
See application file for complete search history.

(56) References Cited

U.S. PATENT DOCUMENTS

| | | | |
|---|---|---|---|
| 313,146 A * | 3/1885 | Willsie | E04H 17/266 256/42 |
| 366,076 A * | 7/1887 | Cleaveland | E04H 17/266 256/42 |
| 442,893 A | 12/1890 | Hood et al. | |
| 447,436 A | 3/1891 | Parker | |
| 459,392 A | 9/1891 | Cleaveland | |
| 493,432 A | 3/1893 | Kidd | |
| 519,546 A | 5/1894 | McClure | |
| 553,235 A | 1/1896 | Fuller | |
| 562,015 A * | 6/1896 | Morgan | E04H 17/266 24/134 R |
| 598,494 A | 2/1898 | Bennett | |
| 598,641 A * | 2/1898 | Nelson | F16G 11/12 114/109 |
| 604,302 A * | 5/1898 | Clark | B60P 7/083 24/909 |
| 713,730 A * | 11/1902 | Willmarth | E04H 17/08 24/909 |
| 735,026 A | 7/1903 | Willmarth et al. | |
| 760,450 A | 5/1904 | Hall | |
| 1,287,050 A * | 12/1918 | Kranz | B60P 7/083 254/218 |
| 1,480,917 A * | 1/1924 | Robinson | A01G 17/06 47/44 |
| 1,613,791 A | 1/1927 | Forrester | |
| 1,752,029 A * | 3/1930 | Robertson | F16G 11/12 256/42 |
| 1,948,845 A | 2/1934 | De Right | |
| 2,217,323 A | 10/1940 | Sackett | |
| 2,375,507 A | 5/1945 | Tuyl | |
| 2,416,708 A | 3/1947 | Moore | |
| 2,449,235 A | 9/1948 | Krupp | |
| 2,484,449 A | 10/1949 | Fetterman | |
| 2,496,249 A | 1/1950 | Lawrence | |
| 2,536,341 A | 1/1951 | Asher | |
| 2,650,454 A | 9/1953 | Wurdinger | |
| 2,761,725 A | 9/1956 | Rushing | |
| 3,175,806 A | 3/1965 | Prete | |
| 3,187,686 A | 6/1965 | De Podesta | |
| 3,518,791 A * | 7/1970 | Carson | A01G 17/08 24/115 R |
| 3,881,694 A | 5/1975 | Gardner | |
| 3,949,968 A | 4/1976 | Verhelst | |
| 4,270,581 A | 6/1981 | Claxton et al. | |
| 4,336,667 A | 6/1982 | Evans | |
| 4,536,989 A | 8/1985 | Caywood | |
| 4,738,051 A | 4/1988 | Dyson | |
| 4,754,825 A | 7/1988 | Scheffer | |
| 5,063,709 A | 11/1991 | Whittaker | |
| 5,210,973 A * | 5/1993 | Kratky | A01G 9/128 47/44 |
| 5,357,710 A | 10/1994 | Dulik | |
| 6,000,171 A | 12/1999 | Wotton | |
| 6,000,172 A | 12/1999 | Ballarino et al. | |
| 6,293,521 B1 | 9/2001 | Parrish | |
| 6,350,088 B1 | 2/2002 | Priester | |
| 6,435,478 B2 | 8/2002 | Parrish | |
| 6,820,862 B2 * | 11/2004 | Terzagi | F16G 11/12 254/213 |
| 6,928,772 B2 | 8/2005 | Bai et al. | |
| 6,932,543 B2 | 8/2005 | Kim | |
| 6,973,751 B2 | 12/2005 | Pierce, Jr. | |
| 7,281,352 B2 | 10/2007 | Peck | |
| 7,544,120 B1 | 6/2009 | Tardif | |
| 7,694,458 B2 * | 4/2010 | Fukuyama | A01G 9/12 47/46 |
| 7,818,915 B1 | 10/2010 | Flaishman | |
| 8,100,923 B2 | 1/2012 | Paraschac | |
| D661,562 S | 6/2012 | Stevens | |
| 8,225,547 B2 | 7/2012 | Debruin | |
| 8,402,611 B2 | 3/2013 | Chang | |
| 8,424,241 B2 | 4/2013 | Schaeffer | |
| D744,320 S * | 12/2015 | Parrish | A01G 9/126 D8/356 |
| 2001/0052593 A1 | 12/2001 | Parrish | |
| 2004/0026678 A1 | 2/2004 | Vandergriff | |
| 2010/0051887 A1* | 3/2010 | Wooster | B21F 9/00 254/217 |
| 2010/0229463 A1* | 9/2010 | DeBruin | A01G 9/126 47/46 |
| 2012/0247015 A1 | 10/2012 | Brusco | |
| 2013/0042525 A1 | 2/2013 | Bortolussi et al. | |
| 2013/0118069 A1 | 5/2013 | Hunt | |
| 2014/0041294 A1 | 2/2014 | Babcock | |
| 2014/0250779 A1 | 9/2014 | Bortolussi | |

FOREIGN PATENT DOCUMENTS

| | | | |
|---|---|---|---|
| EP | 384942 A1 | 9/1990 | |
| EP | 1688034 B1 | 12/2007 | |
| FR | 2269300 A1 * | 11/1975 | A01G 17/06 |
| KR | 101107732 B1 | 1/2012 | |
| WO | 14174417 | 10/2014 | |

OTHER PUBLICATIONS

Orchard Valley Supply—Installing the Vineyard Trellis—online manual—downloaded Dec. 2014 from http://viticulture.hort.iastate.edu/research/pdf/installtrellis.pdf.
Kencove Farm Fence Supplies—Fastening Methods for Trellis Wire—downloaded Dec. 2014 from http://www.kencove.com/fence/125_Fastening+Methods_resource.php.
Jackson Fencing—Heavy Duty Ratchet Strainer—downloaded Dec. 2014 from https://www.jacksons-fencing.co.uk/product/sc_342000/-heavy-duty-ratchet-strainer-galvanized.aspx?tpc=BF&fmc=CC&fnc=AX&timber=0.
He, S., Embedded Tensioner, English Abstract of Chinese Patent Publication CN103128699, Jun. 5, 2013, European Patent Organization, http://www.epo.org/searching/free/espacenet.html.
Alberts, H., Clamp for a chain link wire fabric stretch bar, English Abstract of European Patent Publication EP0384942, Sep. 5, 1990, European Patent Organization, http://www.epo.org/searching/free/espacenet.html.
Hong, K.H., Growth guide equipment of vine crops, English Abstract of Korean Patent Publication KR101107732, Jan. 25, 2012, European Patent Organization, http://www.epo.org/searching/free/espacenet.html.
English Machine Translation of Chinese Patent Application Publication CN103128699 published on Jun. 5, 2013, the English Machine Translation was accessed and downloaded as early as Dec. 10, 2014 from https://www.google.com/patents/CN103128699A?cl=en&dq=CN103128699&hl=en&sa=X&ei=Ak4cVd-fCYr3oATa5lKoDw&ved=0CB0Q6AEwAA.
English Machine Translation of European Patent Application Publication EP0384942 published on Sep. 5, 1990, the English Machine Translation was accessed and downloaded as early as Dec. 10, 2014 from https://www.google.com/patents/EP0384942A1?cl=en&dq=EP0384942&hl=en&sa=X&ei=l04cVeGTCJKtogTzmoDACg&ved=0CB4Q6AEwAA.
Juanita Popenoe, Tara A. Baugher, Richard K. Zimmerman and Arthur Selders, Growing Grapes in West Virginia, Vest Virginia University Extension Service, 1990, Downloaded Dec. 5, 2014 from http://www.wvu.edu/-agexten/nortcult/fruits/grograps.htm.
Fastening Methods for Trellis Wire, downloaded Dec. 10, 2014 from http://www.kencove.com/fence/125_Fastening+Methods_resource.php.

(56) References Cited

OTHER PUBLICATIONS

In-Line Wire Tightener, downloaded Dec. 10, 2014 from http://www.orchardvalleysupply.com/ovsstore/pc/inlineWireTightener15p18 .htm.
Installing the Vineyard Trellis, Jul. 2002.

* cited by examiner

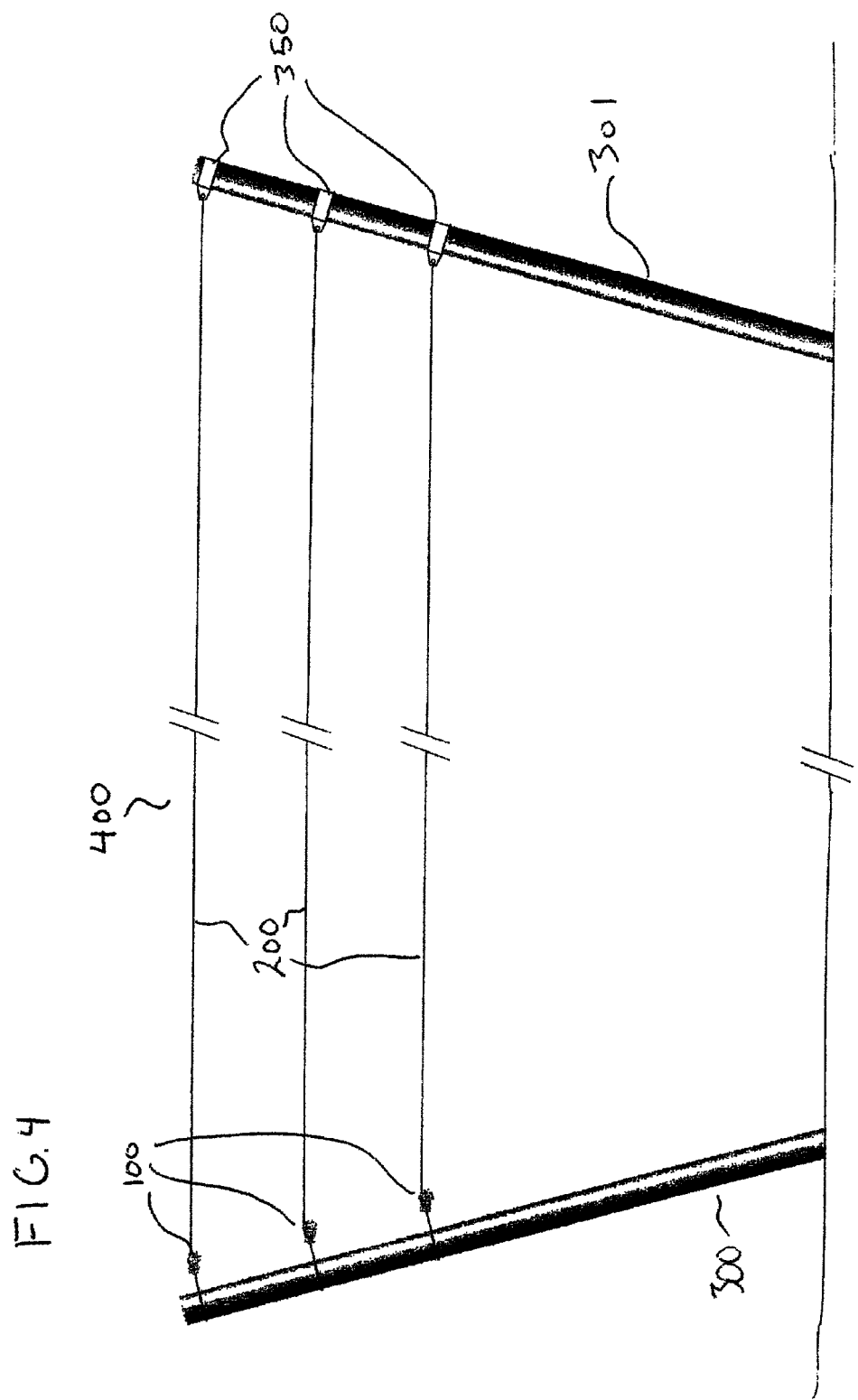

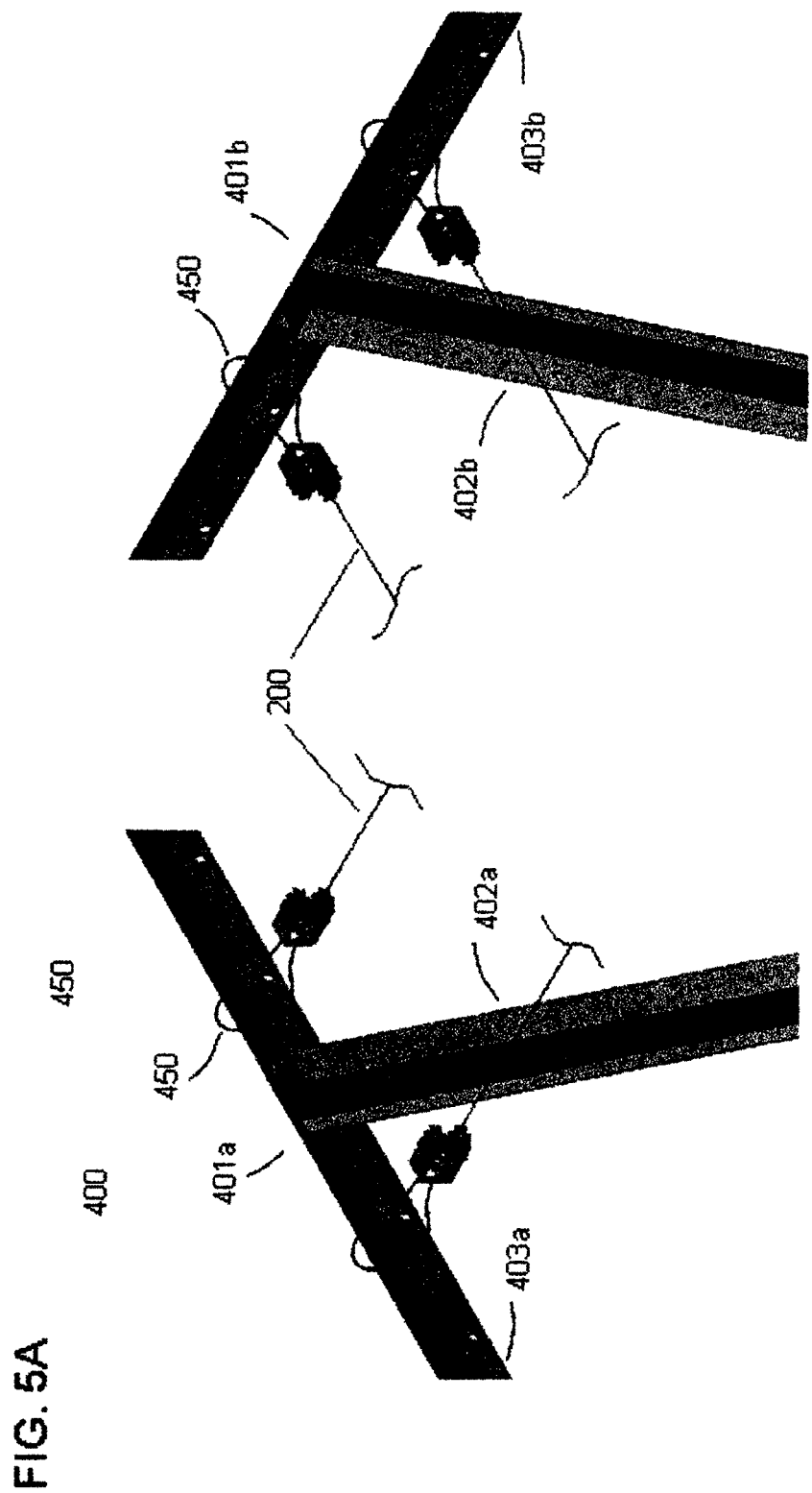

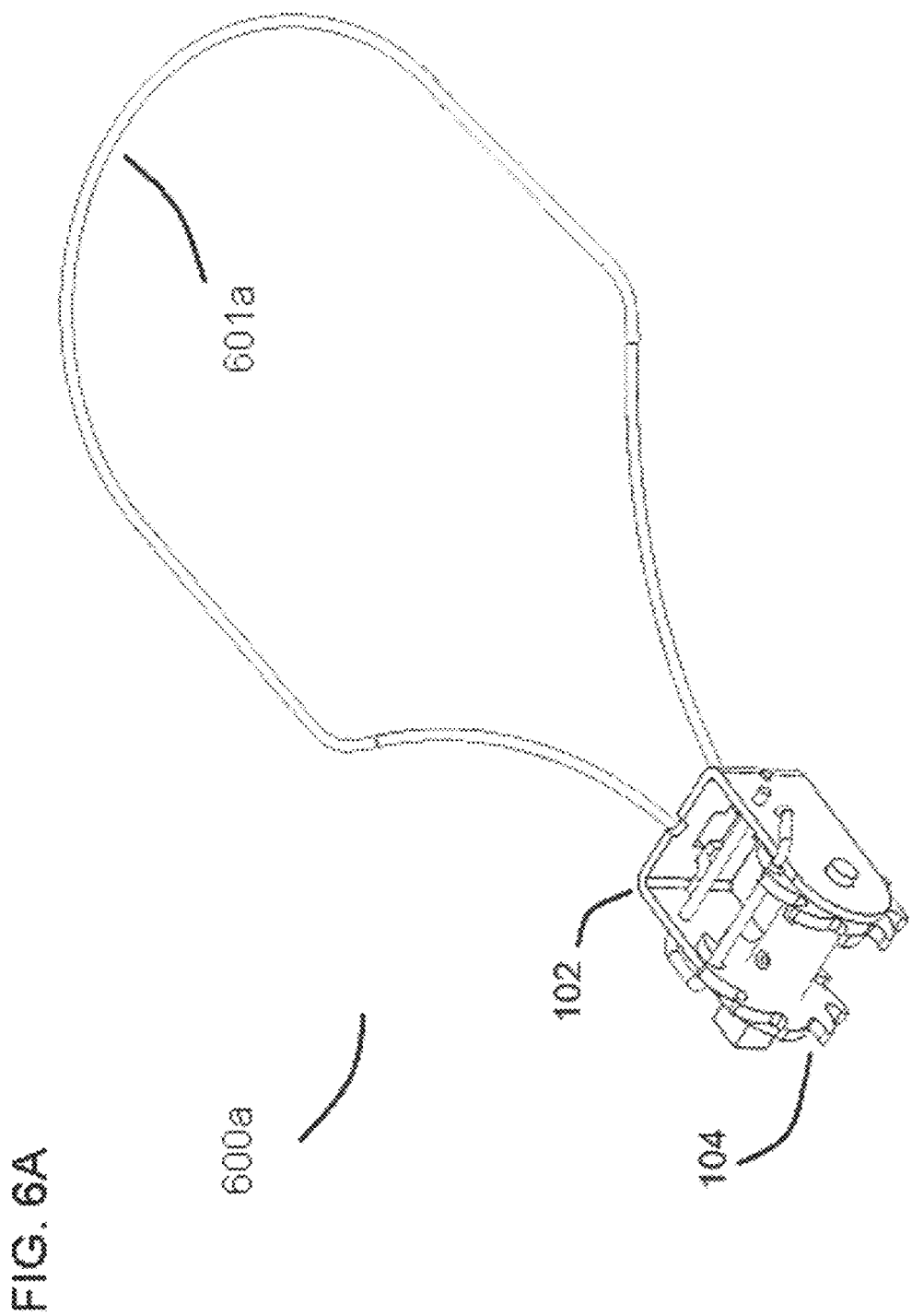

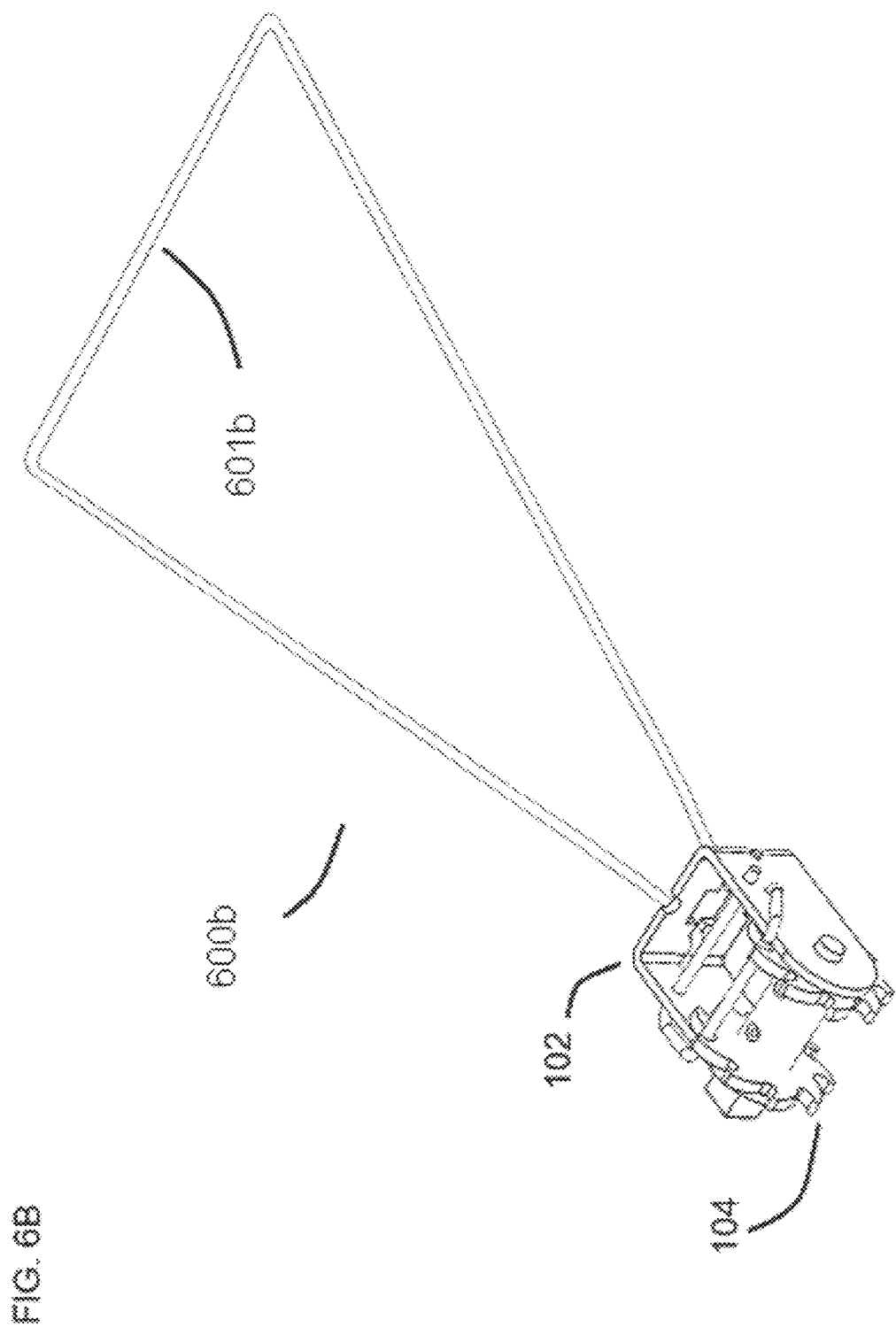

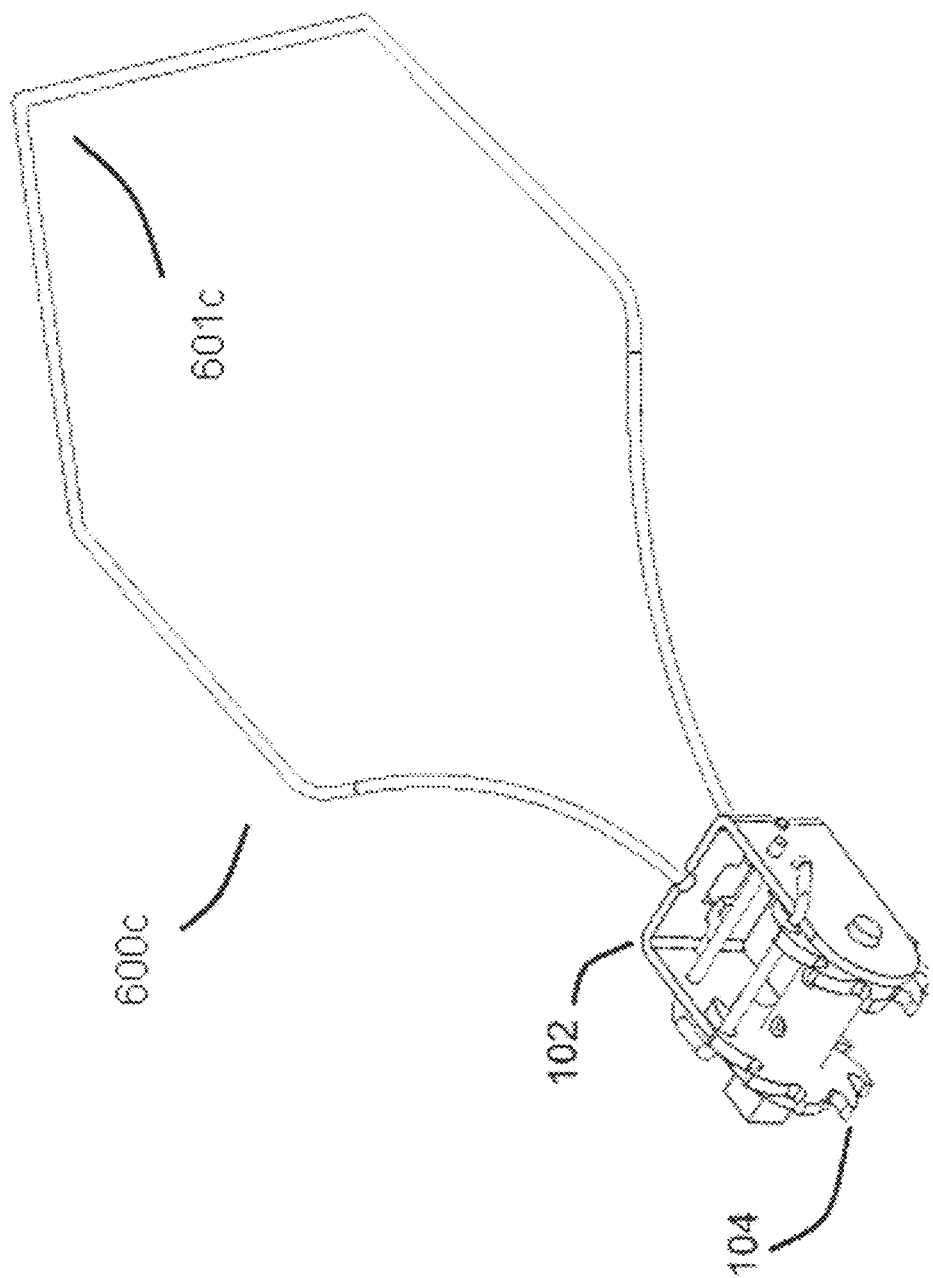

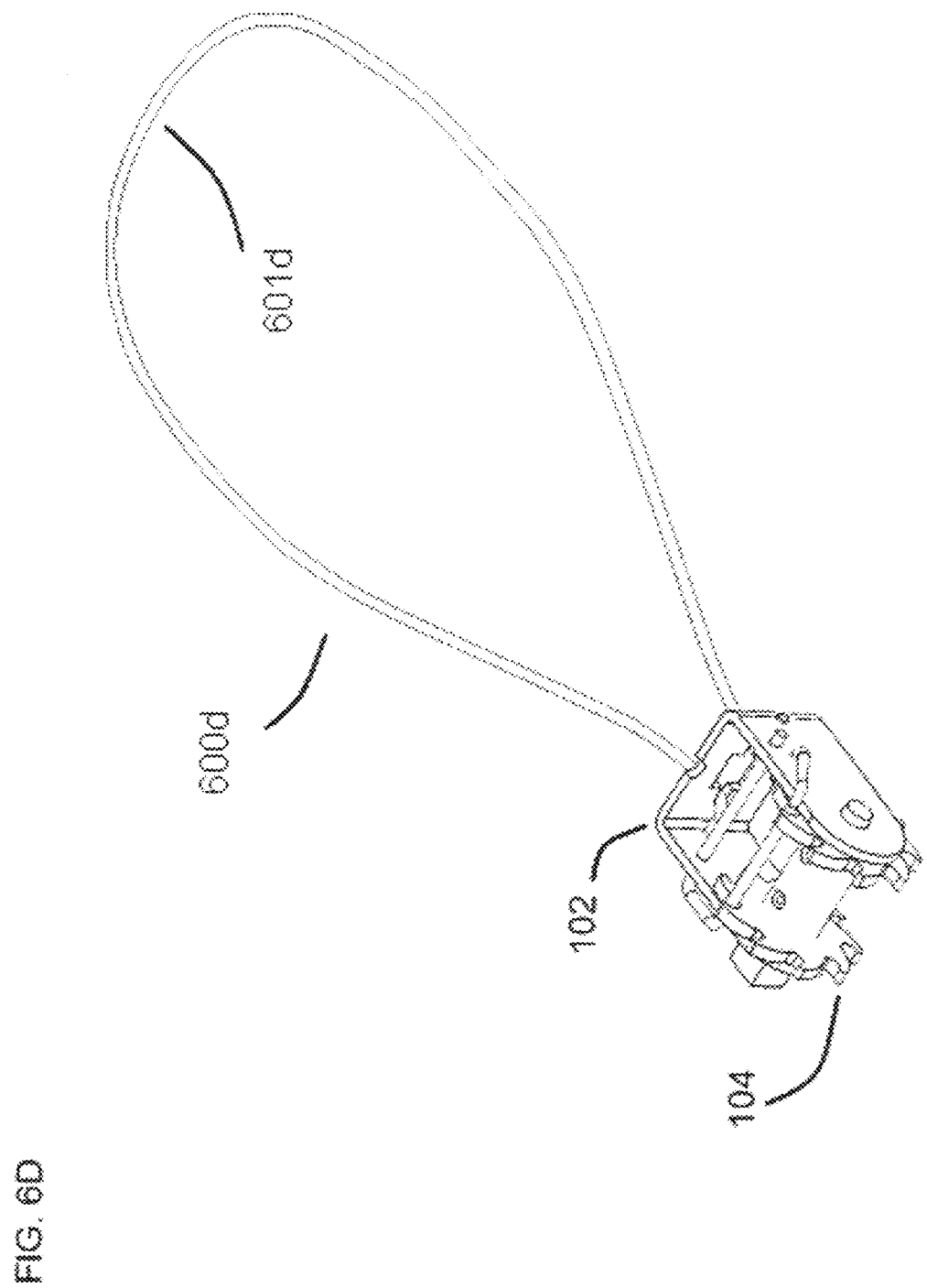

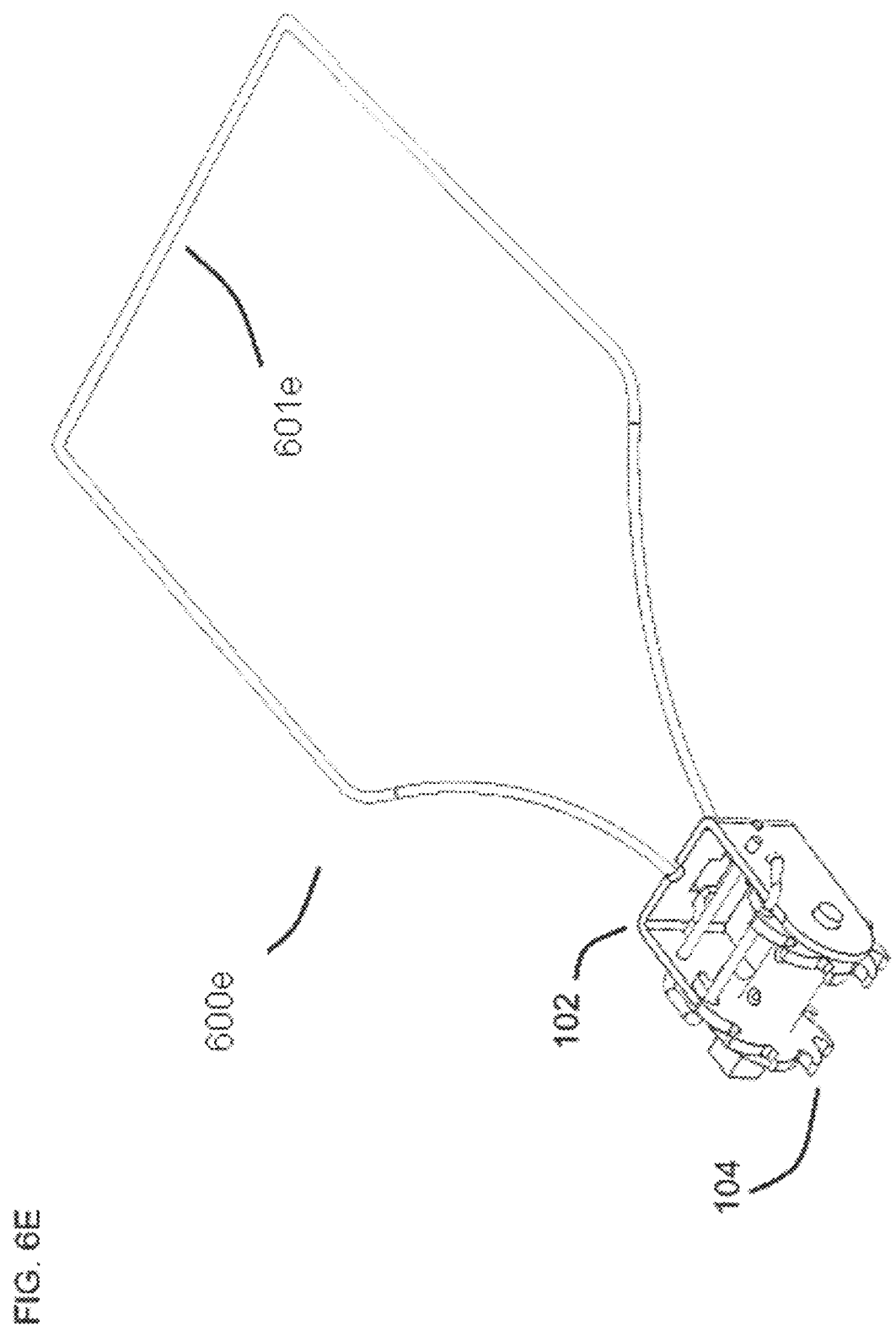

LINE ATTACHMENT MECHANISM AND SYSTEMS AND METHODS FOR USING THE SAME

FIELD OF THE INVENTION

The present invention relates to improved wire and line attachment mechanisms for plant support and trellis systems for supporting plant growth, and methods of using the same in trellising and plant growth training. The attachment mechanisms may be quickly and efficiently installed to decrease the time and cost of installing the plant support or trellis system.

DISCUSSION OF THE BACKGROUND

Because of the temporary nature of the growing season in some areas, requiring the rotation or alternation of crops, it is advantageous to have vertical growth supporting structures (e.g., trellis systems) that are easy to assemble, disassemble, store, and move. There are many structures and systems for the supporting the vertical growth of plants. Various combinations of poles, slats, cords and wires, as well as metal, concrete and wood structures are currently in use.

However, systems that are currently used to maintain vertical growth of certain kinds of plants (e.g., grapes, bell peppers, tomatoes, etc.) have drawbacks that have not been addressed. These systems are often difficult and time consuming to assemble. Typically, such systems include a single central set of posts with wires strung therebetween on which the plants may be trellised and trained. The wires are typically wound around each post and then tied or cinched to an end post. Both the installation and disassembly of such central post and wire systems is very labor-intensive and expensive, especially in a large growing operation.

While there are existing designs that are functional to support vertical plant growth, many have disadvantages that reduce their usefulness by being complicated, cumbersome, and difficult to assemble and disassemble. It is therefore desirable to provide devices and systems for installing plant support systems that can be more efficiently installed, removed, and stored.

SUMMARY OF THE INVENTION

The present invention provides improved wire and line attachment mechanisms (hereinafter also referred to as "wire loop devices") that offer significant improvements in efficiency with regard to assembling and disassembling a plant growth supporting system (e.g., a trellis system), and methods of using the same. The wire loop device may be quickly and easily used to attach a wire or other support line to a support pole or stake, or a horizontal crossbar or angled extension bar thereof (e.g., an anchoring pole at the end of a crop row or a crossbar or extension bar thereof; hereinafter collectively referred to as the "support bar") and provide a means of tightening the wire or support line once the attachment mechanism is engaged with the support bar e.

The wire loop devices may each include a sturdy wire loop having a functional shape for engagement with the support bar, and an anchoring portion for engagement with a wire strainer bracket. The functional shape may include, without limitation, a circular or approximately circular, oval, ellipsoidal, triangular, square, trapezoidal, or other polygonal shape, and may be substantially two dimensional (flat). The functional shape may correspond with a shape of the support bar such that the wire loop may easily slide onto the support bar, and may be easily adjusted on the support bar from a first position to a second position. The wire loop may be made from heavy metal wire or composite material. The anchoring portions of the wire basket may each include angled or flared 90° ends or elbows (having a bend therein at an angle of about 40° to about 100°, e.g., 90° or any other angle or range of angles therein) that engage with sidewalls of the wire strainer bracket to anchor the wire loop to the wire strainer bracket. The connection between the anchoring portions of the wire loop and the strainer bracket may be sufficiently strong to prevent the wire loop from being ripped out of the wire strainer bracket under high tension.

The wire loop devices may also include a wire or line strainer for attaching to and straining trellis wire or other support lines. The strainer may include a ratcheting spool to which the wire may be attached, and the spool may be cranked to tighten the attached wire or line to the desired tension without the wire or line unwinding or slipping. The ratcheting spool may have an attachment point or structure (e.g., a tang) thereon for engaging a tool (e.g., a wrench) for cranking the spool.

The combined structures of the wire loop and the wire strainer bracket can be attached to a high tensile strength support line (e.g., a trellis wire or other high tensile strength line) and easily slipped over the support bar anchoring the support line. The support line may then be tightened by cranking the spool. Once the support line is tightened, friction between the wire loop and the support bar may keep the wire basket in place on the support bar. The wire basket may optionally have a textured or roughened surface to increase friction between it and the support bar.

The wire loop devices may be operable to tighten and hold the high tensile strength support line (e.g., high tensile strength plastic or polymer line, metal wire, composite line, etc.) that may be stretched along a crop row at high tension. The support line may be stretched between a first support bar and a second support bar that are positioned at opposite ends of a crop row (e.g., hundreds of feet apart). The support line may be attached at one end to the wire loop device and the wire loop device may be slipped over the first support bar. The opposite end of the support line may be statically attached to the second support bar. In other embodiments, the opposite end of the support line may be attached to the second support bar by a second wire loop device or other anchor device that may be slid along the second support bar. The support line may then be ratcheted onto the spool of the wire loop device such that it is sufficiently taut to support the vertical growth of plants in the crop row. Thus, the wire loop devices of the present invention may be used to support and/or train plants along an entire crop row.

Additionally, a plurality of support lines may be provided between the first support bar and the second support bar in order to train the vertical growth of plants in the crop row. For such an arrangement, a first support bar and a second support bar are provided, each comprising a vertical member and a lateral member. The lateral members may be attached to the vertical members such that they jut out about orthogonally from the length of the crop row and horizontally or at an oblique angle with respect to the vertical member. A plurality of support lines may each be individually attached to a first plurality of wire loop devices as described herein. The plurality of support lines may each be individually attached at their opposite ends to a second plurality of wire loop devices. The first plurality of wire loop devices may be slipped over the lateral member of the first support bar, and the second plurality of wire loop devices may be slipped over the lateral member of the second support bar such that the support lines are substantially parallel and optimally spaced apart for growth and training of the plants. The plurality of support lines may then be ratcheted onto the spools of the first plurality of wire loop devices and the second plurality of wire loop devices to a predetermined tension such that the plurality of support lines is sufficiently taut to support the vertical growth of plants in the crop row. In some embodiments, the plurality of second wire loop devices may alternatively include a simple clamp (e.g., a clip and thimble clamp, a cable seal, etc.) for attaching to the wire and the first plurality of wire loop devices may be used to tighten the support lines.

As the plants grow and fill the space or spaces between the plurality of support lines, the upper growth of the plants (e.g., shoots, limbs, etc.) may block sunlight from reaching the lower central area of the plant, which may prevent fruit and limb growth in all but the upper areas of the plant. To improve sunlight penetration to the lower parts of the plant, the wire loop devices adjustable support lines may be slid along the support bars such that the support lines draw the upper growth of the plant away from the center to thereby optimize the amount of light, rain, or other treatment reaching the lower central areas of the plants. The position of a support line may be easily adjusted for such purpose by loosening the spool of either the first wire loop device, or the second wire loop device, or both, sliding the first and second wire loop devices along their respective horizontal members such that the support lines move shoots or limbs of the plants laterally away from the center growth of the plants, thereby allowing sunlight to penetrate the central areas of the plants. The spool of the wire loop device(s) may then be ratcheted such that the support line returns to a tension sufficient to support the growth and training of the plants.

The present invention offers efficiencies in the installation of vertical growth systems over conventional systems. The wire loop devices of the present invention may be used to install up a vertical growth support system (e.g., a trellis system) in a crop row quickly and efficiently, and adjust and train vertical growth of the plants in stages to maintain adequate sunlight on the central areas of the plants, without the need to wind and tighten the support line around individual poles or stakes. Thus, the present invention saves a substantial amount of time and man-hours in comparison to conventional support devices and techniques used in trellising systems. The present trellising system also allows an efficient mechanism for training upper plant growth to maintain adequate sunlight on the lower and central portions of the plant.

During installation of support lines, the support lines may be laid out along the entire crop row between a first support bar at one end of the crop row and a second support bar at the other end of the crop row. For example, the support lines can be spooled out from a tractor, truck, or other vehicle quickly and efficiently. The support bars may be sufficiently stably anchored to the ground to withstand the high tensile stress that will be applied to them by the support line (e.g., the base posts, which may be attached to or integrally formed with the support bars, may be driven into the ground several feet, may be angled away from the crop row, and/or may have concrete poured around the buried and base portions thereof, etc.). The first end of the support lines may be attached to a first wire loop device, which may then be slipped over a first support bar, while a second end of the support lines may be tied, tacked, or otherwise statically attached to a second support bar, or may be attached to a second wire loop device which may be slipped over the second support bar.

The wire loop portion of each wire loop device may be simply passed over the support bar and each wire loop device may be placed at a different vertical and/or horizontal distance along the support bar to space out the support lines. The support bars may include a lateral member that is positioned orthogonally with regard to the length of the crop row and that may be about horizontal or that may be attached to the vertical member at an oblique angle.

Each support line may be attached (e.g., threaded through) the cinching mechanism in the wire loop device (e.g., a ratcheting crank) such that the support lines may be tightened to a preferred tension after the wire loop device is tightly and firmly engaged with the support bar. Without limiting the invention, the support lines may be made from a material that allows the application of tension in a range of about 20 lbs. to about 2000 lbs. (e.g., about 50 to about 1500 lbs., about 100 to about 1000 lbs., or any other value or range of values therein). For example, and without limitation, the support lines may be made from a high-tensile strength wire (e.g., high strength, high tensile steel, etc.), polymer material (e.g., aromatic polyamide fibers, PBO, etc.), composite material, etc.

The present wire loop devices may also be used in plant support systems that utilize multiple sets or groups of support lines. For example, and without limitation, some plant support systems may use laterally spaced support lines that flank or run parallel to a crop row to support vertical growth of the crop plants and/or to prevent or limit low-lying lateral crop growth along the ground. Such systems may have two laterally spaced sets of terminal poles that flank each end of the crop row. The wire loop devices of the present invention may be used to connect support lines to such lateral terminal poles and apply tension to the support lines. The wire loop devices may then be slid vertically along the terminal poles as the growth of the plants concentrates at higher points above the ground, thereby maintaining tighter vertical growth of the plants. The wire loop devices of the present invention are not limited to the applications discussed herein and other applications and uses of the wire loop devices are within the scope of the present invention.

The advantages of the present invention are further illustrated by the embodiments described herein. It is to be understood that there are several variations in the trellis system, and that the embodiments described herein are presented for purposes of illustration and description. They are not intended to be exhaustive or to limit the invention to the precise forms disclosed.

In some embodiments, and without limitation, the present invention relates to an attachment device that includes a wire loop having a loop portion and two attachment portions, the loop portion having a functional shape, the functional shape, which may correspond to a shape of a support bar such that multiple contact points or a substantial surface area contact is achieved, and the two attachment portions each having an extension portion and an anchor, the anchor having an angle in a range of about 40° to about 100° relative to the extension portion; a wire strainer bracket having first and second sidewalls and a rear wall connecting the first and second sidewalls, where the two attachment portions pass through a passage in the rear wall and each of the anchors engage with one of the sidewalls; and a spool for attaching and tightening a support line for supporting vertical growth of a plant. The wire loop may include a heavy gage metal wire that can maintain its shape and engagement with the sidewalls of the strainer bracket under high tension. The wire loop may withstand the support line being tightened to a tension in a range of 20 lbs. to about 2000 lbs. (e.g., about 50 to about 1500 lbs., about 100 to about 1000 lbs., or any other value or range of values therein). The anchor may have an angle of about 90° relative to the extension portion. The engagement of the anchors of the wire loop with the sidewalls may be sufficiently strong to prevent pullout of the anchors under tension in the above range. The wire strainer may include a first hole in the first sidewall and a second hole in the second sidewall, where the anchors engage with the first and second holes. The wire loop may be made from a rigid metal or composite material. The passage in the rear wall may include two lateral slots, each for receiving the extension portion of one of the attachment portions of the wire loop. The lateral slots may prevent vertical or outward movement of the attachment portions of the wire loop relative to said wire strainer bracket.

The functional shape of the loop portion may be circular, oval, ellipsoidal, triangular, polygonal, or other functional shapes. The shape may be chosen such that the loop portion may engage with a corresponding support bar with multiple points of contact and/or maximized surface area contact. In some embodiments, the functional shape is substantially two-dimensional or flat, except for the thickness of the wire.

The spool of the attachment device may include a gear that may function as a portion of a ratchet mechanism. The ratchet mechanism may further include a pawl, such as a spring attached to the wire strainer bracket, where the spring engages with the teeth of the gear.

In some embodiments, and without limitation, the present invention relates to an attachment device for connecting a plant support line to a support bar to thereby suspend the support line over a crop row, the attachment device including an open wire loop structure, which may have a functional shape corresponding to a shape of the support bar such that a high level of surface area contact is achieved, and first and second anchoring portions having laterally flared ends; and a wire strainer bracket for applying tension to the support line, the wire strainer bracket having two lateral sidewalls, each sidewall having an anchor receiving hole, and each anchor receiving hole having one of the first and second flared ends inserted therein, the wire strainer bracket further including a rear wall connecting the two lateral sidewalls, the rear wall having a passage with first and second lateral slots, the lateral slots having a width slightly larger than a diameter of the anchoring portions of the open wire loop structure and the first anchoring portion is positioned within the first lateral slot and the second anchoring portion is positioned within the second lateral slot, where the connection between the open wire loop structure and the wire strainer bracket is sufficiently strong to withstand separation when the strainer bracket applies a tension to the support line of up to 2000 lbs.

In some embodiments, and without limitation, the present invention relates to a method of installing a plant support system that includes laying out at least one support line along a crop row, attaching the at least one support line to an attachment device as described herein and attaching the attachment device to a first support bar at a first end of a crop row, attaching a second end the at least one support line to a second attachment device, and engaging a wire loops of the second attachment device to a second support bar at a second end of a crop row, and applying a predetermined tension to each of the support lines by cranking the spool of each of the first and/or second attachment devices. In other embodiments, and without limitation, the second end of the at least one support line may instead be statically attached to the second support bar by a static anchor, and a predetermined tension is applied to each of the support lines by cranking the spool of the first attachment device. Such embodiments may further include installing in the ground the first and second support bars, at two spaced points along a crop row.

In some embodiments, and without limitation, the present invention relates to a method of installing a plant support system that includes laying out a plurality of support lines along a crop row, attaching a first end of each of said plurality of support lines to one of a first plurality of attachment devices as described herein and engaging the first plurality of attachment devices to a first support bar at a first position on a crop row, attaching each of the second ends of each of the plurality of support lines to one of a second plurality of attachment devices as described herein, the wire loops of each of the second plurality of attachment devices are engaged with the second support bar at a second position along a crop row spaced from the first position, and applying a predetermined tension to each of the support lines by cranking the spool of each of the first and/or second attachment devices. In other embodiments, and without limitation, each of said second ends of each of the plurality of support lines may instead be statically attached to the second bar by static attachment members (e.g., clamps), and a predetermined tension is applied to each of the support lines by cranking the spool of each of the first attachment devices.

In some embodiments, and without limitation, the present invention relates to a method of installing a plant growth support system, including laying out a plurality of support lines along a crop row; engaging a first end of each of the plurality of support lines to a wire loop device and engaging the wire loop device with a first terminal support bar at a first end of said crop row; engaging a second end of each of the plurality of support lines to a wire loop device and engaging; the wire loop device with a second terminal support bar at a second end of the crop row; and tightening the support lines using the wire loop devices to tension in a range of about 20 lbs. to about 2000 lbs. The method may further include moving the plurality of support lines laterally to move limbs or shoots of the plants laterally so as to allow sunlight to reach lower and central portions of the plants. This step may be performed after the plants have been allowed to grow vertically for a period (e.g., 5 days to 2 months). The tension in the support lines may be reduced prior to laterally moving the support lines by releasing the pawl of the crank mechanism and then respooling the support lines to an intermediate tension before sliding the support lines laterally. After being repositioned, the support lines may be tightened to a tension in a range of about 20 lbs. to about 2000 lbs. using the wire loop devices attached to the first terminal support bar and/or the wire loop devices attached to the second terminal support bar.

It is an object of the present invention to provide a tensioning device for trellis or plant support systems that allows the system to be quickly and efficiently installed for growing trellised crops.

It is also an object of the present invention to provide a tensioning device that can be quickly slipped over a support bar at the end of a crop row.

It is also an object of the present invention to provide a tensioning device with an open wire loop portion comprising a functional shape which corresponds to a shape of a support bar at the end of a crop row such that multiple points of contact or significant surface area contact is achieved between the wire loop portion and the support bar.

It is also an object of the present invention to provide a tensioning device that can apply high tension to trellis wires or other plant support lines without failure of the tensioning device.

It is also an object of the present invention to provide a method of installing trellis wires or other support lines on a trellis and support system that reduces the installation time of the trellis or support system.

It is also an object of the present invention to provide a method of adjusting the position of a support line on a trellis and support system that reduces the time required to adjust the position of the support line.

Additional aspects and objects of the invention will be apparent from the detailed descriptions and the claims herein.

BRIEF DESCRIPTION OF THE DRAWINGS

FIG. 4 is a side view of a plant growth system according to an embodiment of the present invention.

FIG. 5A is a perspective view of a plant growth system according to an embodiment of the present invention.

FIGS. 6A-6F are a perspective views of an attachment device of an alternative shape according to an embodiment of the present invention.

DETAILED DESCRIPTION

Figure 1:
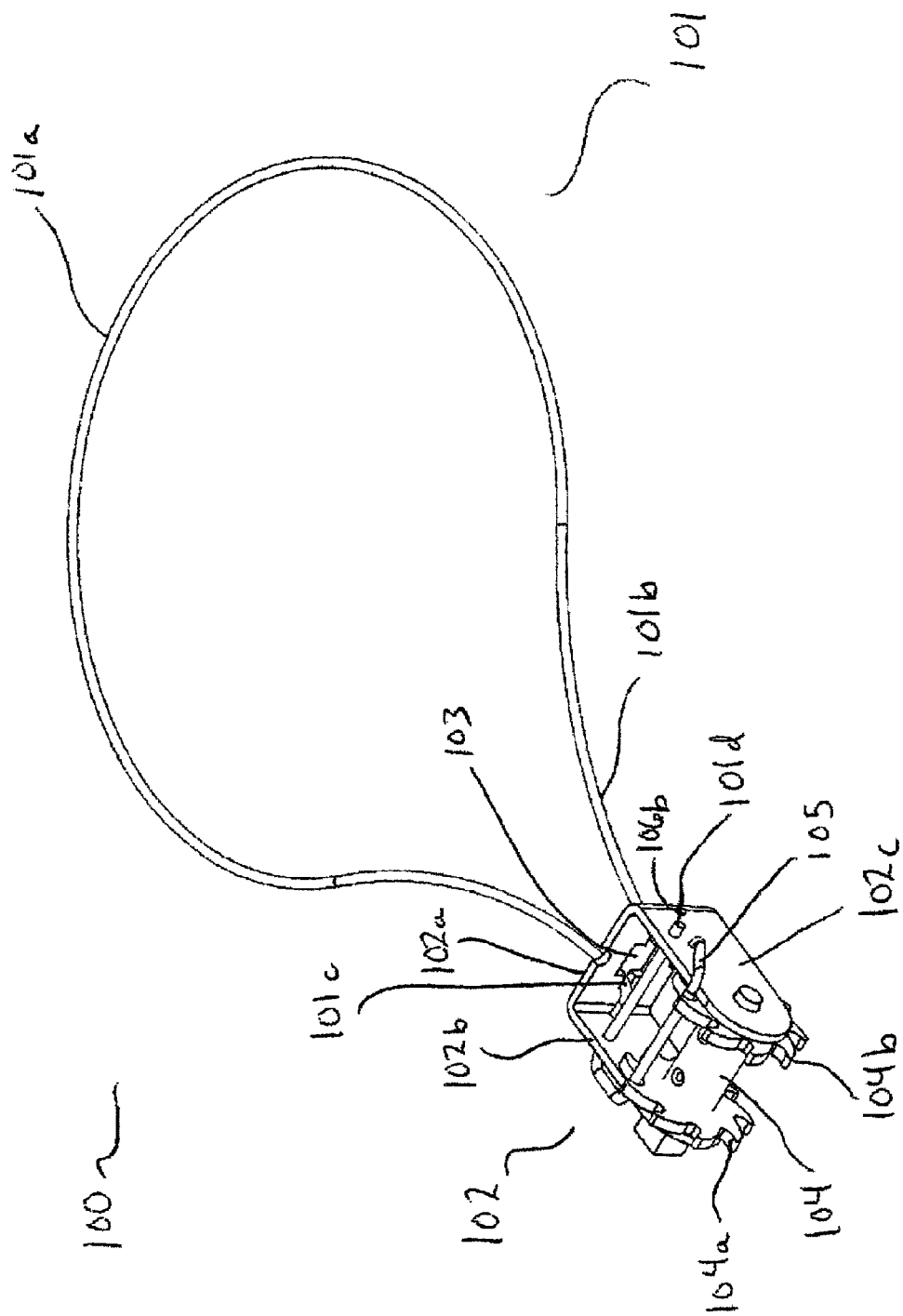
FIG. 1 is a perspective view of an attachment device according to an embodiment of the present invention.

Reference will now be made in detail to certain embodiments of the invention, examples of which are illustrated in the accompanying drawings. While the invention will be described in reference to these embodiments, it will be understood that they are not intended to limit the invention. To the contrary, the invention is intended to cover alternatives, modifications, and equivalents that are included within the spirit and scope of the invention as defined by the claims. In the following disclosure, specific details are given to provide a thorough understanding of the invention. However, it will be apparent to one skilled in the art that the present invention may be practiced without these specific details.

Referring to the drawings wherein like reference characters designate like or corresponding parts throughout the several views, and referring particularly to FIGS. 1-6F, it is seen that the present invention includes various embodiments of a wire loop tensioning device for connecting to and applying tension to a support line (e.g., a trellis wire). It is also evident in the drawings that the invention includes methods of using the wire loop devices.

Without limiting the invention, FIG. 1 shows an exemplary embodiment of a wire loop device 100 according to an embodiment of the present invention. Wire loop device 100 includes a wire loop structure 101 which may engage with a support bar of a trellis or plant growth support system, and a strainer bracket assembly 102. The wire loop structure 101 comprising a functional shape 101a, the functional shape 101a may comprise an open circular portion referred to herein as the loop, as well as extensions 101b that may be inserted into the strainer bracket assembly 102. The extensions 101b may each have anchors 101c that may each include angled ends or elbows 101d (having an angle in a range of about 40° to about 100°, e.g., 90° or any other angle or range of angles therein) that engage with sidewalls of the wire strainer bracket to anchor the wire loop 101 to the strainer bracket assembly 102. The connection between the anchoring portions of the wire loop and the strainer bracket may be sufficiently strong to prevent the wire loop from being ripped out of the wire strainer bracket under high tension.

The wire loop 101 may be made from strong metal wire or composite material. For example, and without limitation, the wire loop may be made from a high tensile strength steel rod. In some implementations, and without limitation, the wire loop structure may have a partially or wholly textured surface (e.g., without any coating over the metal loop) that increases friction and bite between the wire loop structure and the pole or other structure with which it may be engaged. Such surface textures may include a ground surface (e.g., a non-reflective unidirectional texture), brushed or dull polished surface, satin-polished (special non-reflective finish that may be corrosion resistant in external conditions), etc. Without limiting the invention, the wire loop may have a textured surface having a roughness average (Ra-μm) in a range of about 0.1 to about 1.5 (e.g., about 0.3 to about 1.0, or any value or range of values therein). In further implementations, and without limitation, additional materials may be included in the wire loop structure such as a polymer anti-weathering coating, a high friction polymer coating material to increase the friction between the wire loop and the pole or other structure with which is engaged, etc.

As shown in FIG. 1, and without limitation, the strainer bracket assembly 102 may have a U-shaped structure that includes a rear wall 102a and first and second sidewalls 102b and 102c. The rear and side walls may be integrally formed, providing structural strength. The strainer bracket assembly 102 may further include a spool 104 that includes lateral gear wheels 104a and 104b. The strainer bracket assembly may also include a spring 105 that engages with one or both of the gear wheels 105a and 105b.

Figure 2:
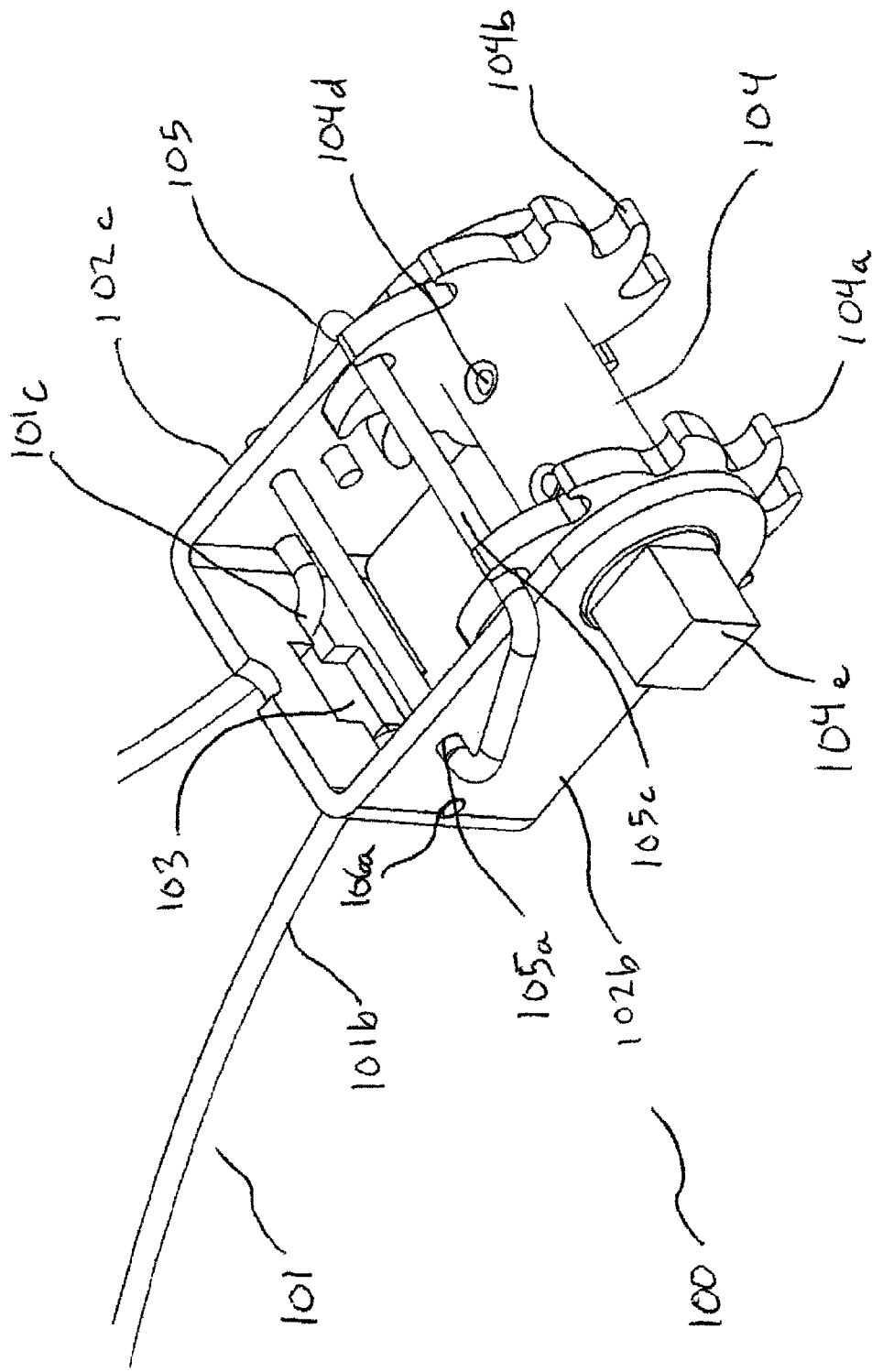
FIG. 2 is a perspective view of a wire strainer bracket of an attachment device according to an embodiment of the present invention.

FIG. 2, without limiting the invention, shows a close-up view of an exemplary strainer bracket assembly 102 to provide a clearer view of the components thereof. The spool 104 and the spring 105 may work together as a ratcheting mechanism. The spring 105 includes two static anchoring portions 105a and 105b that may engage with receiving holes in the bracket sidewalls 102b and 102c, and an engagement bar 105c that is operable to engage with the teeth of the gear wheels 104a and 104b. The spring may be deformable and resilient such that it is displaced as the spool and gears are turned and resiles into engagement with the teeth of the gears when the gears are in a static position. The spool 104 includes a shank or tang 104e that may be engaged with a tool (e.g., a socket wrench, a crescent wrench, pliers, etc.) to rotate the spool 104 and tighten a tension line attached to the spool 104. The spool 104 may include holes 104d for threading and anchoring tension lines to the spool prior to applying tension to the tension lines.

Figure 3B:
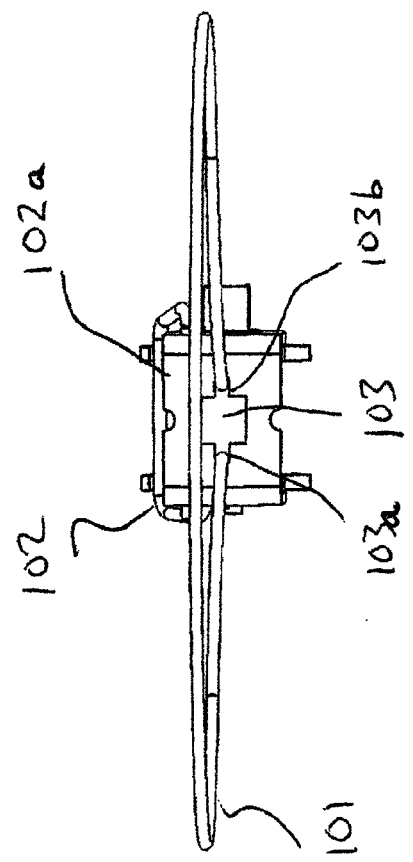
FIG. 3B is an anterior view of a wire strainer bracket of an attachment device according to an embodiment of the present invention.
Figure 3A:
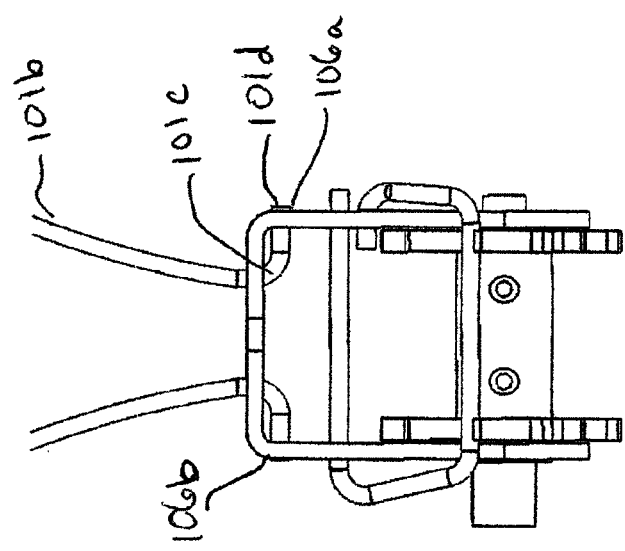
FIG. 3A is an overhead view of a wire strainer bracket of an attachment device according to an embodiment of the present invention.

FIGS. 3A and 3B, without limiting the invention, show a close-up view of the interconnection of the anchoring portions 101c of the wire loop 101 and the strainer bracket 102. The two attachment portions 101c may pass through an opening 103 in the rear wall 102a of the strainer bracket. The opening in the rear wall of the strainer bracket may have a specialized shape that allows the attachment portions of the wire loop to pass through the opening and also engage with narrow lateral slots therein. For example, the opening 103 includes lateral slots 103a and 103b that have a vertical dimension that is slightly larger than the diameter of the two attachment portions 101c of the wire loop 101. The shape of the opening 103 may allow the attachment portions to be squeezed together and passed through the opening 103, and to then be slotted into the lateral slots 103a and 103b after they are passed through the opening 103. Additionally, the angled portions 101d of the two attachment portions 101c may simultaneously be inserted into lateral holes 106a and 106b in the lateral walls 102b and 102c of the strainer bracket. The combination of the insertion of the angled ends 101d of the wire loop 101 and the insertion of the attachment portions 101c into the lateral slots 103a and 103b provides a stable connection between the wire loop 101 and the strainer bracket. The interaction of the attachment portions 101c and the lateral slots 103a and 103b prevents the wire loop 101 from shifting or rotating up or down along a vertical plane. Also, the angle of the attachment portions 101c of the wire loop 101 may be positioned to abut the lateral slots 103a and 103b in the rear wall 102a of the strainer bracket such that as tension is applied to the wire loop 101, the angle applies pressure against the rear wall 102a. The pressure between the attachment portions 101c and the rear wall 102a and the pressure between the angled portions 101d and the holes 103a and 103b may prevent deformation of the attachment portions 101c (e.g., straightening of the angled portions 101d). Additionally, the wire loop may include a heavy gage metal wire that can maintain its shape and engagement with the sidewalls of the strainer bracket under high tension.

The wire loop device of the present invention may be used in a crop support system for supporting crop plants (e.g., grapes, bell peppers, tomatoes, flowers, onions, garlic, peas, etc.) using high tension support lines. One advantage of using the wire loop device of the present invention is that the support lines may be laid out along the entire crop row and attached quickly and efficiently to end support bars at each end of a crop row, without the need to tie each of the support lines to each of a multitude of trellises or other support structures between the end support bars. The present wire loop device allows the retaining lines to be suspended at high tension along the crop row without the need for additional support between the end support bars. The avoidance of having to thread the ends of the support lines through or around intermediate support line receivers saves a substantial amount of labor and time in the process of installing the crop support system. Once the support lines are routed through the support line receivers, the support lines may be tightened by the wire loop devices to a preferred tension thereby providing scaffolding upon which the plants in the crop row may be supported during growth.

Without limiting the invention, FIG. 4 shows a view of an exemplary crop support system 400 that includes multiple wire loop devices 100 of the present invention arranged vertically. The support lines 200 (e.g., high tension lines) may be strung between anchoring end support bars 300 and 301 (the breaks shown in the support lines 200 and the ground indicate that the length of the support lines and the distance between the end support bars 300 and 301 may vary). The support lines 200 may be attached at one end by tying or mechanically anchoring to an end support bar 301 at a first end of a crop row. Mechanical couplers 350 may be used to connect the support lines to the end support bar 301. Mechanical couplers 350 may include one or more devices to resist slippage or shearing of the high tensile line (e.g., a crimp sleeve for receiving the support line, etc.). The other end of the support lines 200 may each be attached to a spool of one of the wire loop devices 100, as described herein. The wire loop of the wire loop device 100 may then be engaged with the end support bar 300 at a second end of the crop row.

Alternatively, the support lines 200 may be attached at a first end to a first wire loop device 100, and at a second end to a second wire loop device. The first wire loop device 100 may then be engaged with the first end support bar 300, and the second wire loop device may be engaged with the second end support bar 301.

Once the attachment devices 350 and/or 100 are engaged with the support bars 300 and 301, the ratcheting mechanism of the wire loop devices 100, made up of the spool 104 and the spring 105 may be ratcheted to tighten the support lines 200. The support lines 200 may be made from a material that allows the application of tension in a range of about 20 lbs. to about 2000 lbs. (e.g., about 100 to about 1000 lbs., or any value or range of values therein). For example, and without limitation, the support lines 200 may be made from a high-tensile strength wire (e.g., high strength, high tensile steel, etc.), polymer material (e.g., aromatic polyamide fibers, PBO, etc.), composite material, etc.

The wire loop devices 100 may tighten the support lines 200 sufficiently to suspend the support lines 200 with substantially no sag when crop plants are attached to and/or rest on the support lines 200. The support lines 200 may be tightened by cranking the spools 104 of the wire loop devices 100 using a manual or motorized cranking tool or other leverage device (e.g., a socket wrench, a crescent wrench, pliers, an electric driver, etc.; not shown) to apply the preferred tension to the support lines 200.

The tension applied to the support lines 200 may require that the end support bars 300 and 301 be strongly secured, so that they are not uprooted and do not collapse toward one another. The end support bars 300 and 301 may be driven several feet into the ground (e.g., to a depth in a range of about two feet to about five feet, or any value or range of values therein) and may be angled away from the crop row in order to withstand the tension applied to the support lines 200. The end support bars 300 and 301 may also include features that prevent them from being uprooted themselves. For example, and without limitation, the end support bars 300 and 301 may include one or more plates along the buried portion thereof that provide more surface area against the soil. For example, and without limitation, the end support bars 300 and 301 may be tee posts with foot plates attached thereto.

The present invention provides a plant growth support system (e.g., a trellis system) that may be laid out in a more efficient way than conventional support systems, while still being structurally sound. According to methods of the present invention, the support lines 200 may be laid out along an entire crop row, attached to the end support bars 300 and 301, and tightened to a high tension without the need for attachment to an intervening structure. Sufficient tension may be applied to the support lines 200 to enable the support lines to support the vertical growth of the crops planted in the crop row.

The support lines 200 may be spooled out along the crop row from a tractor, truck, or other vehicle quickly and efficiently without having to thread the ends of the support lines 200 through closed-loop structures on a trellis or support structure or having to wrap tie the line around the trellis or support structure. The vertical support structures may be driven into the ground either before or after the support lines are laid out. The end support bars 300 and 301 may be present at each end of the crop row to provide an anchor to the high tension support lines 200.

Once the vertical support structures are in position, the support lines 200 may be attached via a first wire loop device 100 of the present invention, to a first end support bar 301 at one end thereof and to a second wire loop device 100 of the present invention at the other end thereof. The wire loop devices 100 may then be slipped onto and engaged with the adjacent end support bars 300 and 301, and tension may then be applied to the support lines 200 by cranking the ratcheting mechanisms 104 on each of the wire loop devices 100.

With the support system installed and the support lines 200 tightened, crop plants may be grown and trained (e.g., manually placed on the support lines and vertical support frames) over the growing season so that the plants are maintained in a vertical posture.

In further embodiments, the design of the plant growth support system of the present invention may reduce the number of vertical support structures (trellises) that are used in conventional support systems. The high-tension support lines 200 may provide added structural support that allows for relatively large gaps between adjacent vertical support structures. For example, the vertical support structures may be spaced apart by a distance in a range of about 10 feet to about 100 feet (e.g., about 20 feet to about 80 feet, or any other value or range of values therein).

Figure 5B:
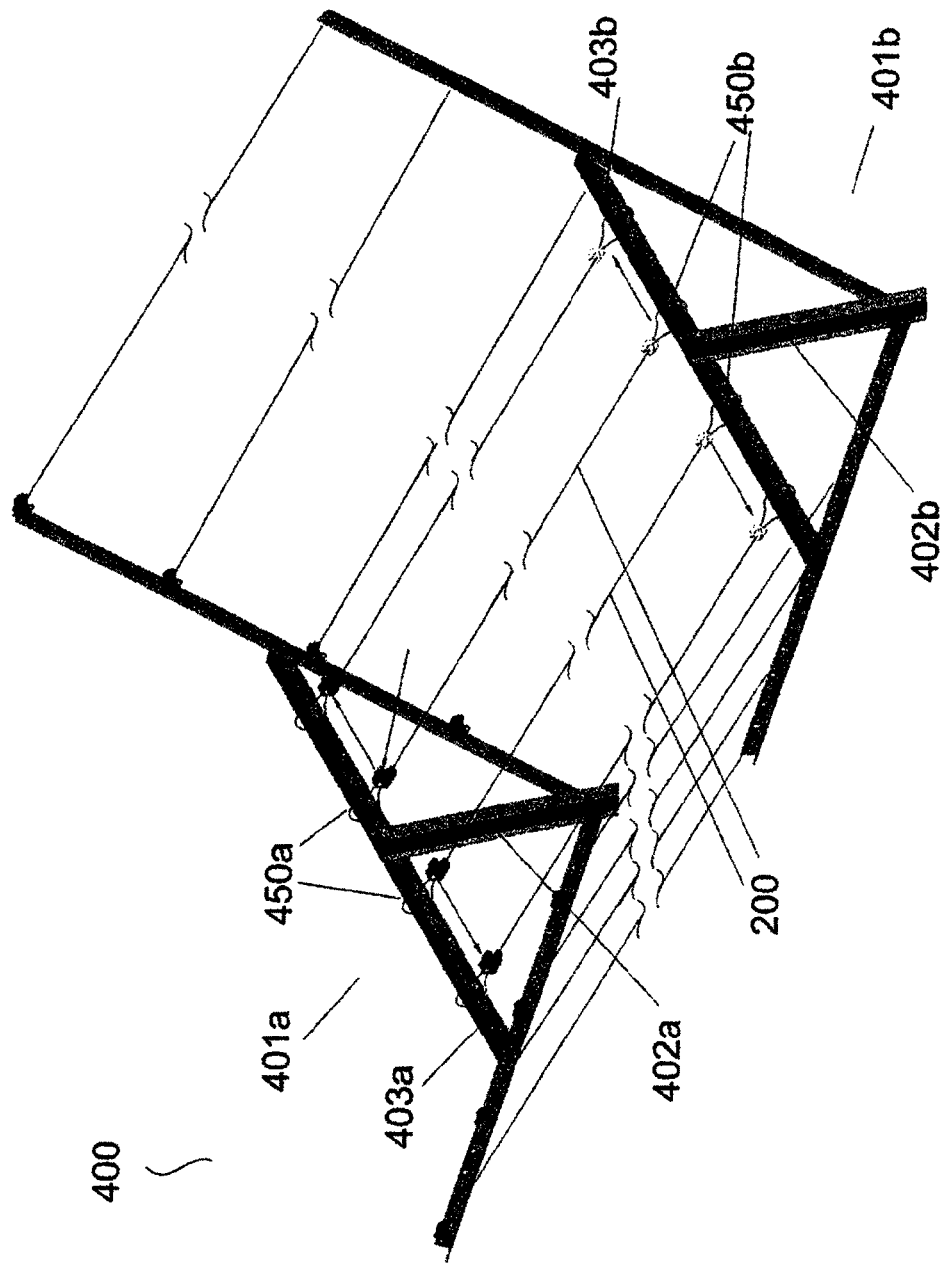
FIG. 5B is a perspective view of an adjusted plant growth system according to an embodiment of the present invention.
Figure 8F:
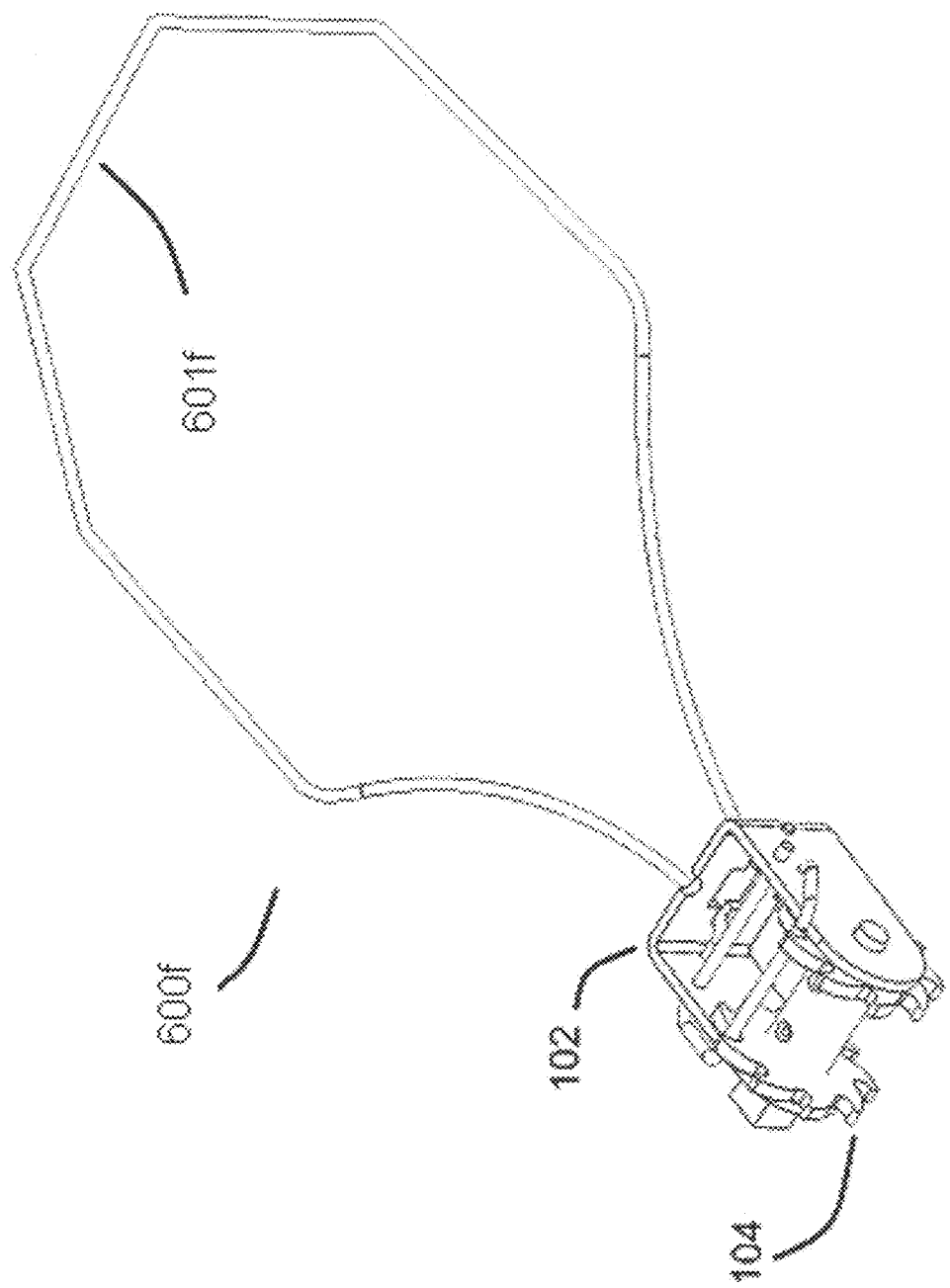

Without limiting the invention, FIG. 5A shows a perspective view of an exemplary crop support system 400 that includes a plurality of support lines 200 of the present invention arranged horizontally with respect to each other. The system 400 includes two end support bars 401a and 401b, which are not shown in an in situ alignment arrangement in FIG. 5A to enable a view of the wire loop devices on each support bar (FIG. 5B shows the system 400 in in situ alignment). A first end support bar 401a comprises a vertical member 402a and a horizontal member 403a. A first end of said plurality of support lines 200 may each be individually attached to a first plurality of wire loop devices 450a, and each of the first plurality of wire loop devices 450a may slide onto the horizontal member 402a of the first end support bar 401a. A second end of each of the plurality support lines 200 may be attached to a second plurality of wire loop devices 450b and the second plurality of wire loop devices 450b may slide onto the horizontal member 403b of a second end support bar 401b such that the support lines are optimally spaced apart for growth and training of plants. Alternatively, the second end of each of the plurality support lines 200 may be each be statically attached to the horizontal member 402b of the second end support bar 401b with a plurality of mechanical couplers (see FIG. 4, generally).

After installation of the trellising system, the trellised plants (e.g., grape vines) grow and fill the space or spaces between the plurality of support lines, the upper growth of the plants (e.g., shoots, limbs, etc.) may block sunlight from reaching the lower central area of the plant, which may prevent fruit growth in all but the upper growth of the plant. The adjustable support lines may be slid along the support bars to reposition the upper growth of the plant to optimize the amount of light, rain, or other treatment reaching the lower central areas of the plants. The position of a support line may be easily adjusted for such purpose by loosening the spool of either the first wire loop device, or the second wire loop device, or both, sliding the first and second wire loop devices along their respective horizontal members such that the support lines move shoots or limbs of the plants laterally away from the center growth of the plants, thereby allowing sunlight to penetrate the central areas of the plants. The spool of the wire loop device(s) may then be ratcheted such that the support line returns to a tension sufficient to support the growth and training of the plants.

FIG. 5B shows the system 400 in alignment, with the plurality of support lines 200 spanning between the wire loop device 450a and 450b along a crop row. Applicant points out that there are breaks in the plurality of support lines 200 (indicated by the sinusoidal lines) to enable the view of the system to fit on a single sheet. As demonstrated by the laterally pointing arrows, the wire loop devices may be slid laterally toward the lateral ends of the lateral members 403a and 403b to train the vertical growth of plants outward toward the lateral edges of the crop row to enable light, rain, and other nourishing materials to reach the lower and central portions of the plants in the crop row. After a period of growth after planting to allow vertical branches and shoots to develop, the tension in the support lines 200 may be partially released and the wire loop devices 450a and 450b may be slid laterally outward to reposition the vertical limbs toward the lateral edge of the trellis system. Applicant wishes to point out that the trellis system may have additional frame members and additional support wires for training the growth of the trellised plants, as shown in FIG. 5B.

The present application may include various embodiments of the wire loop device, having various shapes of the wire loop structure to accommodate various shapes of support bars.

Without limiting the invention, FIG. 6A shows a perspective view of a wire loop device 600a of the present invention. Said wire loop device 600a may comprise a strainer bracket assembly 102 and a spool 104 (which may be the same as discussed above), and a wire loop 601a, wherein said wire loop comprises a functional shape which may provide several points of contact with a support bar having a cross-sectional profile that is similar to or is complementary in shape to the wire loop 601a. The shape of wire loop 601a may provide substantial surface area contact with the similarly shaped support bar.

Without limiting the invention, FIG. 6B shows a perspective view of a wire loop device 600b of the present invention. Said wire loop device 600b may comprise a strainer bracket assembly 102 and a spool 104 (which may be the same as discussed above), and a wire loop 601b, wherein said wire loop comprises a functional shape which may provide several points of contact with a support bar having a cross-sectional profile (e.g., a triangular cross-sectional shape) that is similar to or is complementary in shape to the wire loop 601b. The wire loop 601b may provide substantial surface area contact with the similarly shaped support bar Without limiting the invention, FIG. 6C shows a perspective view of a wire loop device 600c of the present invention. The wire loop device 600c may comprise a strainer bracket assembly 102 and a spool 104 (which may be the same as discussed above), and a wire loop 601c, wherein said wire loop comprises a functional shape which may provide several points of contact with a support bar having a cross-sectional profile (e.g., a polygonal or triangular cross-sectional shape) that is similar to or is complementary to the shape of the wire loop 601c. The shape of wire loop 601c may provide several points of contact or substantial surface area contact with the similarly shaped support bar.

Without limiting the invention, FIG. 6D shows a perspective view of a wire loop device 600d of the present invention. The wire loop device 600d may comprise a strainer bracket assembly 102 and a spool 104 (which may be the same as discussed above), and a wire loop 601d, wherein said wire loop comprises a functional shape which may provide several points of contact with a support bar having a cross-sectional profile (e.g., a round or oblong cross-sectional shape) that is similar to or is complementary to the shape of wire loop 601d. The shape of wire loop 601d may provide several points of contact or substantial surface area contact with the similarly shaped support bar Without limiting the invention, FIG. 6E shows a perspective view of a wire loop device 600e of the present invention. Said wire loop device 600e may comprise a strainer bracket assembly 102 and a spool 104 (which may be the same as discussed above), and a wire loop 601e, wherein said wire loop comprises a functional shape which may provide several points of contact with a support bar having a cross-sectional profile (e.g., a square or otherwise rectangular cross-sectional shape) that is similar to or is complementary to the shape of wire loop 601a. The shape of wire loop 601a may provide substantial surface area contact with the similarly shaped support bar.

Without limiting the invention, FIG. 6F shows a perspective view of a wire loop device 600f of the present invention. Said wire loop device 600f may comprise a strainer bracket assembly 102 and a spool 104 (which may be the same as discussed above), and a wire loop 601f, wherein said wire loop comprises a functional shape which may provide several points of contact with a support bar having a cross-sectional profile (e.g., a hexagonal or otherwise polygonal cross-sectional shape) that is similar to or is complementary to the shape of wire loop 601f The shape of wore loop 601f may provide substantial surface area contact with the similarly shaped support bar.

The present invention provides an attachment mechanism for a support system for vertical plant growth and method of installing the same that requires less time to assemble than conventional systems, without sacrificing the structural strength and integrity. It is to be understood that here are several variations in the attachment mechanisms, and that the foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed:

1. An attachment device, comprising:
   a. an open wire loop having a loop portion and two attachment portions,
      i. said wire loop portion having a functional shape for engaging a support bar, and
      ii. said wire loop portion is rigid and maintains said functional shape under tension; and
      iii. said two attachment portions each having an extension portion and an anchor, said anchor having an angle in a range of about 40° to about 100° relative to said extension portion;
   b. a wire strainer bracket having first and second sidewalls and a rear wall connecting the first and second sidewalls, wherein said two attachment portions pass through a passage in said rear wall and each of said anchors engage with one of said sidewalls and connect said wire loop to said wire strainer bracket without any additional connection points between said wire loop and said wire strainer bracket; and
   c. a spool for attaching and tightening a support line for supporting vertical growth of a plant wherein said spool is rotatably connected to said first and second side walls of said wire strainer.

2. The attachment device of claim 1, wherein said wire loop comprises a heavy gauge metal wire or a rigid composite material.

3. The attachment device of claim 1, wherein said anchor has an angle of about 90° relative to said extension portion.

4. The attachment device of claim 1, wherein said attachment device can tighten said support line to a tension in a range of about 20 lbs. to about 2000 lbs.

5. The attachment device of claim 4, wherein said tension creates sufficient friction to hold said wire loop in place on said support bar.

6. The attachment device of claim 1, wherein said attachment device can tighten said support line to a tension in a range of about 500 lbs. to about 1500 lbs.

7. The attachment device of claim 1, wherein said attachment device can tighten said support line to a tension in a range of about 1000 lbs. to about 2000 lbs.

8. The attachment device of claim 1, wherein said engagement of said anchors with said sidewalls is sufficiently strong to prevent pullout of said anchors under a tension in a range of about 20 lbs. to about 2000 lbs.

9. The attachment device of claim 1, wherein said spool comprises a gear which functions as a portion of a ratchet mechanism.

10. The attachment device of claim 9, further comprising a spring attached to said wire strainer bracket which functions as a pawl of said ratchet mechanism, wherein said spring engages with a set of teeth of said gear.

11. The attachment device of claim 1, wherein said passage in said rear wall includes two lateral slots, each for receiving said extension portion of one of said attachment portions, and said lateral slots prevent vertical movement of said attachment portions of said wire loop relative to said wire strainer bracket.

12. The attachment device of claim 1, further comprising a first hole in said first sidewall and a second hole in said second sidewall, wherein said anchors engage with said first and second holes.

13. The attachment device of claim 1, wherein said functional shape selected from the group consisting of a polygonal shape, a circular shape, and an ellipsoidal shape.

14. A method of installing a plant support system, comprising:
   a. laying out at least one support line along a crop row;
   b. attaching a first end of said at least one support line to a first attachment device comprising
      i. an open wire loop having a loop portion and two attachment portions, said wire loop portion being rigid and able to maintain its shape under tension, and each of said two attachment portions having an extension portion and an anchor, ii. a wire strainer bracket having first and second sidewalls and each of said anchors engage with one of said sidewalls and connect said wire loop to said wire strainer bracket, and iii. a tightening mechanism for attaching and tightening said at least one support line for supporting vertical growth of a plant;

c. engaging the wire loop of the first attachment device to a first support bar at a first position along a crop row;

d. engaging a second end of said at least one support line directly or indirectly to a second support bar; and e. applying a predetermined tension to said at least one support line using said first attachment device.

15. The method of claim 14, wherein said predetermined tension is in a range of about 20 lbs. to about 2000 lbs.

16. The method of claim 14, further comprising:

a. relieving said predetermined tension to said at least one support line;

b. sliding said attachment device from a first position on said first support bar to a second position on said first support bar; and c. applying said predetermined tension to said at least one support line using said attachment device.

17. The method of claim 14, wherein said two attachment portions each have an extension portion and an anchor, said anchor having an angle of about 90° relative to said extension portion.

18. The method of claim 14, wherein said wire strainer bracket has a rear wall connecting the first and second sidewalls, wherein said two attachment portions pass through a passage in said rear wall and each of said anchors engage with one of said sidewalls and connect said wire loop to said wire strainer bracket without any additional connection points between said wire loop and said wire strainer bracket.

19. The method of claim 18, wherein said passage in said rear wall includes two lateral slots, each for receiving said extension portion of one of said attachment portions, and said lateral slots prevent vertical movement of said attachment portions of said wire loop relative to said wire strainer bracket.

20. The method of claim 14, wherein said loop portion has a shape selected from the group consisting of a polygonal shape, a circular shape, and an ellipsoidal shape.

21. A method of installing a plant support system for training vertical growth of a plant, comprising:

a. engaging a wire loop of a first wire loop attachment device with a first support bar located at a first position along a crop row;

b. engaging a wire loop of a second wire loop attachment device with a second support bar located at a second position along the crop row, wherein a first end of a plant support line is attached to said first wire loop attachment device and a second end of said plant support line is attached to said second wire loop attachment device; and c. applying a predetermined tension to said plant support line using a tightening mechanism of said first attachment device to which said plant support line is attached;

d. waiting a period to allow the plant to grow vertically and reach the vertical position of said plant support line;

e. subsequent to said period reducing said tension in said plant support line and (i) sliding said first wire loop attachment device along said first support bar laterally away from said crop row and (ii) sliding said second wire loop attachment device along said second support bar laterally away from said crop row, wherein steps (i) and (ii) push upper limbs of said plant laterally away from a center of said plant to allow sunlight to reach said center of said plant; and f. applying a second tension to said plant support line using said tightening mechanism of said first attachment device after steps (i) and (ii).

22. The method of claim 21, wherein said predetermined tension is in a range of about 20 lbs. to about 2000 lbs.

23. The method of claim 21, wherein said first wire loop attachment device and said second wire loop attachment device each comprise:

a. an open wire loop having a loop portion and two attachment portions, said wire loop portion being rigid and able to maintain its shape under tension, and each of said two attachment portions having an extension portion and an anchor, b. a wire strainer bracket having first and second sidewalls and each of said anchors engage with one of said sidewalls and connect said wire loop to said wire strainer bracket, and c. a spool for attaching and tightening said plant support line for supporting vertical growth of a plant.

24. The method of claim 23, wherein said two attachment portions each have an extension portion and an anchor, said anchor having an angle in a range of about 40° to about 100° relative to said extension portion.

25. The method of claim 23, wherein said spool is a ratcheting spool for connecting to said support line and applying tension to said support line.

26. The method of claim 23, wherein said wire strainer bracket has a rear wall connecting the first and second sidewalls, wherein said two attachment portions pass through a passage in said rear wall and each of said anchors engage with one of said sidewalls and connect said wire loop to said wire strainer bracket without any additional connection points between said wire loop and said wire strainer bracket.

27. The method of claim 26, wherein said passage in said rear wall includes two lateral slots, each for receiving said extension portion of one of said attachment portions, and said lateral slots prevent vertical movement of said attachment portions of said wire loop relative to said wire strainer bracket.

28. The method of claim 23, wherein said loop portion has a shape selected from the group consisting of a polygonal shape, a circular shape, and an ellipsoidal shape.

* * * * *